United States Patent [19]
Mannherz et al.

[11] 3,745,824
[45] July 17, 1973

[54] INSERT-TYPE ELECTROMAGNETIC FLOWMETER

[75] Inventors: Elmer D. Mannherz, Southampton; John S. Yard, Warminster, both of Pa.

[73] Assignee: Fischer & Porter Co., Warminster, Pa.

[22] Filed: Sept. 14, 1971

[21] Appl. No.: 180,430

[52] U.S. Cl. ............................................. 73/194 EM
[51] Int. Cl. ............................ G01f 1/00, G01p 5/08
[58] Field of Search ............................... 73/194 EM

[56] References Cited
UNITED STATES PATENTS

| | | | |
|---|---|---|---|
| 3,406,569 | 10/1968 | Rohmann | 73/194 EM |
| 3,323,363 | 6/1967 | Ketelsen | 73/194 EM |
| 3,373,608 | 3/1968 | Ketelsen | 73/194 EM |

FOREIGN PATENTS OR APPLICATIONS

| | | | |
|---|---|---|---|
| 1,915,324 | 10/1969 | Germany | 73/194 EM |

OTHER PUBLICATIONS
Magnetic Flowmeters, Fischer & Porter Catalog C10D, September, 1967, pg. 2.

*Primary Examiner*—Charles A. Ruehl
*Attorney*—Michael Ebert

[57] ABSTRACT

An electromagnetic flowmeter which is insertable within a pipe line conducting a fluid whose flow rate is to be measured. The flowmeter includes a flow-tube assembly of small radial thickness constituted by concentrically-arranged inner and outer tubes defining an annular region. This region is occupied by an electrostatic shield, a pair of oppositely-disposed flat coils contoured to conform to the curvature of the inner tube to establish a magnetic field in a direction mutually perpendicular to the longitudinal axis of the inner tube and to the axis of the electrodes installed thereon, and a magnetic shell surrounding the coils. The remaining space in the region is filled with a potting compound to seal the components therein.

8 Claims, 7 Drawing Figures

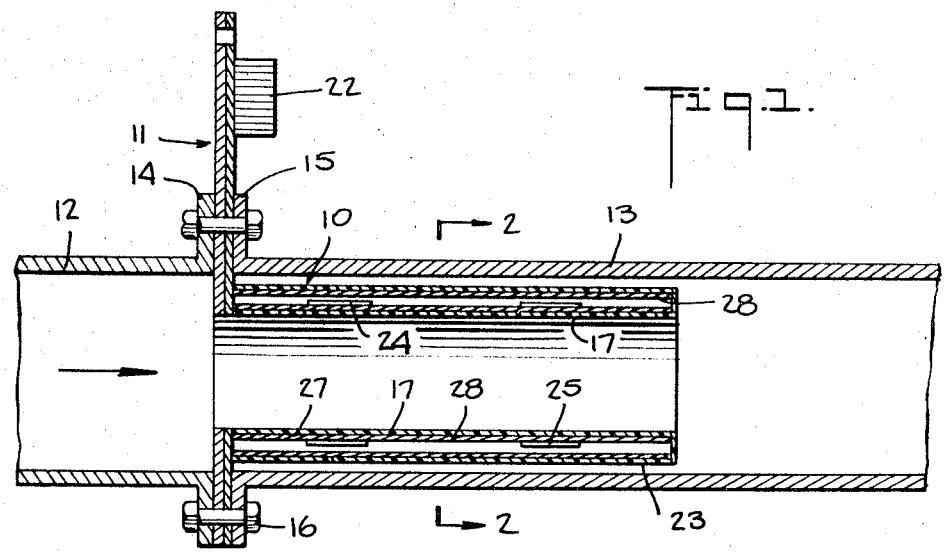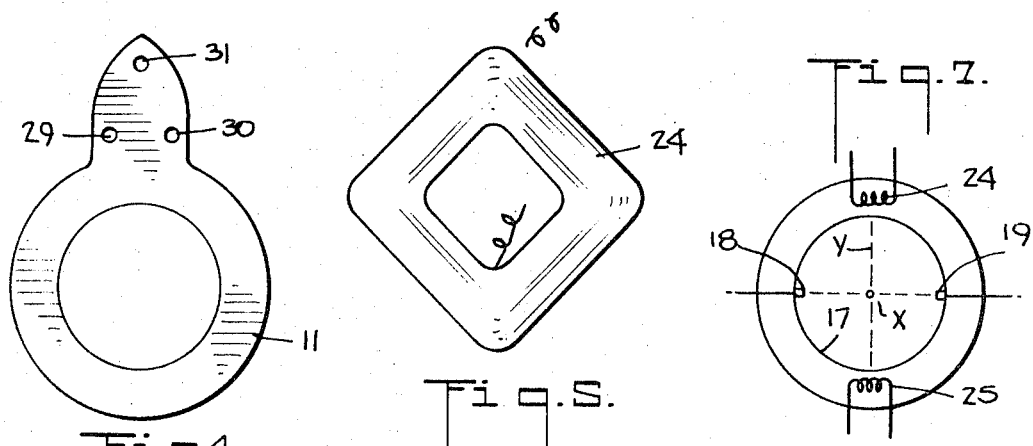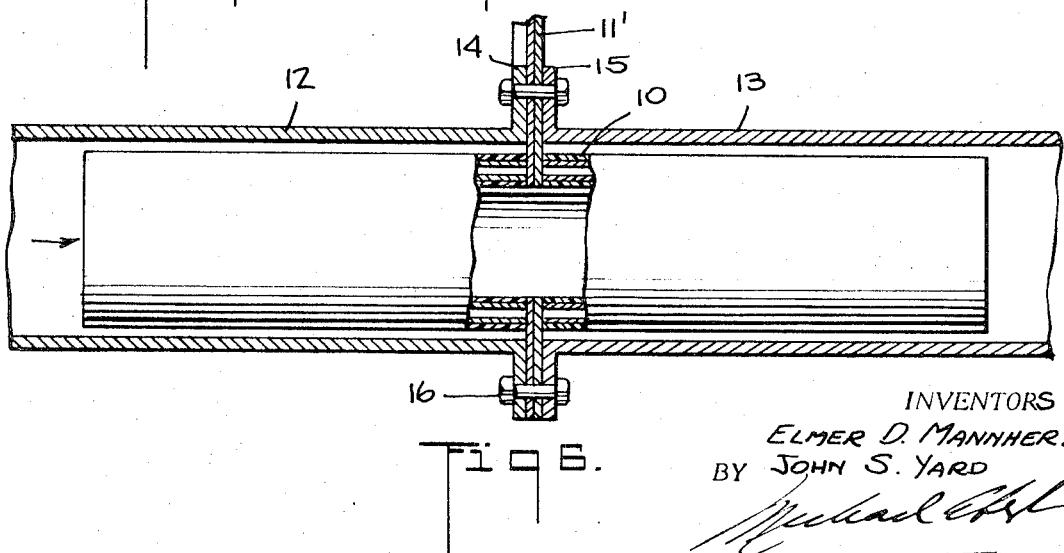

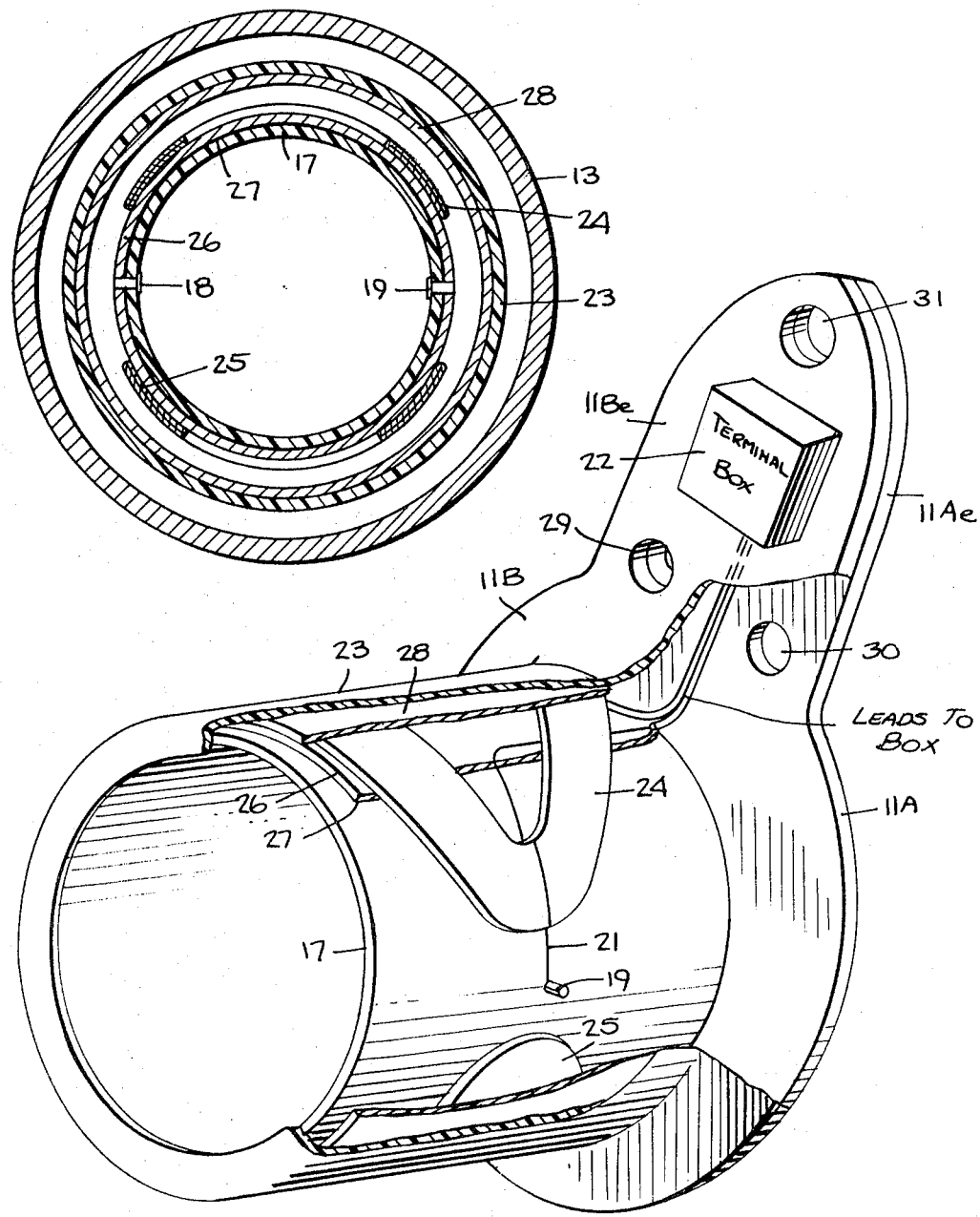

INSERT-TYPE ELECTROMAGNETIC FLOWMETER

BACKGROUND OF THE INVENTION

This invention relates generally to electromagnetic flowmeters, and more particularly to an improved insert-type flowmeter having a markedly reduced insertion loss.

Magnetic flowmeters are adapted to measure volume rates of those fluids which present difficult handling problems, such as corrosive acids, sewage, slurries, detergents, and the like. In a magnetic flowmeter, a magnetic field is generated which is mutually perpendicular to the longitudinal axis of the meter pipe through which the fluid flows and to the axis of the meter electrodes. Since the velocity of the fluid is directed along the longitudinal axis of the pipe, the voltage induced within the fluid will be perpendicular to both the velocity of this fluid and the flux linkages of the magnetic field. Thus the metered fluid constitutes a series of fluid conductors moving through the magnetic field. The more rapid is the rate of flow, the greater the instantaneous value of the voltage established at the electrodes.

The standard magnetic flowmeter is provided with a flow tube having end flanges, whereby the flow tube may be interposed between adjoining line pipes of substantially the same diameter which conduct the fluid whose flow is to be metered. The flanges of the interposed flow tube are bolted or otherwise secured to the flanges on the adjoining pipes in the fluid line.

In a magnetic flowmeter arrangement of the standard type, the flow tube is subjected to the same pressure as the pipes in the line. The flow tube must therefore be of a material and thickness sufficient to withstand this pressure, even though the strength of the flow tube is unrelated to its measuring function. This design factor contributes significantly to the cost of a standard meter.

A reduction in the cost of a flowmeter design may be effected by means of an insert-type meter such as that disclosed in the 1968 patent to Rohmann U.S. Pat. No. 3,406,569, in which the meter, rather than being interposed between line pipes conducting the fluid to be measured, is inserted in a section of one of these pipes. In an insert meter of the Rohmann type, the meter includes a flow tube having a constricted throat section which is surrounded by an electromagnet including a pair of multilayer coils and a laminated iron core, similar to the electromagnet shown in the 1961 patent to Head U.S. Pat. No. 3,005,342.

The radial thickness of an insert meter of the Rohmann type is relatively large, particularly in the throat region. In the insert meter disclosed in the 1963 patent to Sasaki U.S. Pat. No. 3,108,474, in which the inserted tube is of a uniform diameter, the radial thickness is nevertheless large, mainly because of the space requirements imposed by the multi-layer wire bundles of the electromagnet.

Inasmuch as the flow tube in a standard meter has the same diameter as the fluid line pipes, the tube does not obstruct the flow of fluid, hence the flowmeter introduces no loss or pressure drop in the line. However, the standard flowmeter,which is relatively bulky, has other practical drawbacks, as mentioned previously. On the other hand, in an insertion type of flowmeter of the type heretofore known, the relatively large radial thickness of such meters is such as to create a significant obstruction in the fluid path, hence such meters are responsible for a large insertion loss or pressure drop. Thus the economic and other advantages gained by known insert-type flowmeters are to a degree offset by their characteristic insertion losses.

SUMMARY OF THE INVENTION

In view of the foregoing, it is the main object of this invention to provide an insert-type flowmeter having a flow-tube assembly adapted to fit within a line pipe conducting the fluid whose rate is to be measured, the assembly having a relatively small radial dimension and consequently a low insertion loss.

More particularly, it is an object of the invention to provide an insert-type flowmeter of the above type which is so installed in the pipe section that pipe line pressure is imposed both on the interior and outer diameters of the flow-tube assembly, whereby the insert may be made of low-cost materials since it does not have to contain pipe-line pressure as do existing magnetic flowmeters.

Also an object of the invention is to provide a flowmeter of the above-described type, the flowtube assembly having a flange adapted to be clamped between the flanges of adjoining pipes in the flow line for supporting the flow-tube assembly within a section of one of the pipes.

Yet another object of the invention is to provide an insert-type flowmeter that is reliable and accurate in operation and is nevertheless of inexpensive design.

Briefly stated, these objects are attained in a magnetic flowmeter having a flow-tube assembly of relatively small radial diameter formed by concentrically-arranged inner and outer tubes defining an annular region. Placed within the annular region is a conductive layer encircling the inner tube to provide an electrostatic shield for the components of the assembly, and a pair of symmetrically-arranged flat coils contoured to conform to the curvature of the inner tube and adapted to establish a magnetic field mutually perpendicular to the longitudinal axis of the assembly and to the axis of electrodes installed at diametrically-opposed positions on the inner tube. Also disposed in the annular region is a magnetic shell surrounding the coils and spaced therefrom, the remaining space in the region being filled with a potting compound to seal the components therein.

In one preferred embodiment of the invention, the inner and outer tubes are joined to a mounting flange which is adapted to be sandwiched between the end flanges of adjoining pipes in the flow line to support the flow-tube assembly within a section of one of these pipes. The flange is provided with a tab extension serving to support a terminal box, the terminals of which are connected to leads passing through the flange and going to the electrodes, the coils and the conductive layer disposed within the annular region.

OUTLINE OF THE DRAWING

For a better understanding of the invention as well as other objects and further features thereof, reference is made to the following detailed description to be read in conjunction with the accompanying drawing, wherein:

FIG. 1 is a longitudinal section taken through one preferred embodiment of an insert-type magnetic flowmeter in accordance with the invention, the meter being installed in a pipe line conducting the fluid to be measured.

FIG. 2 is a transverse section taken in the plane indicated by line 2—2 in FIG. 1;

FIG. 3 is a perspective view of the flowmeter removed from the pipe line;

FIG. 4 is an end view of the flowmeter shown in FIG. 3;

FIG. 5 is a plan view of one of the flat coils before it is contoured;

FIG. 6 is a longitudinal section through another embodiment of an inert-type meter in accordance with the invention; and FIG. 7 is a schematic diagram illustrating the operation of the flowmeter.

DESCRIPTION OF THE INVENTION

Referring now to FIG. 1, there is shown an insert-type electromagnetic meter in accordance with the invention, the meter including a flow-tube assembly generally designated by numeral 10, which is supported by a mounting flange 11. The fluid whose rate is to be measured, flows through a line including pipes 12 and 13, whose adjoining ends are provided with flanges 14 and 15, respectively.

The flow-tube assembly 10 is inserted within the end section of pipe 13, mounting flange 11 of the meter being sandwiched between pipe flanges 14 and 15 and being secured thereto by bolts 16. The radial diameter of the flow-tube assembly 10 is relatively small, so that it introduces a relatively minor obstruction in the flow passage, thereby minimizing the pressure drop and the insertion loss.

The position of flow-tube assembly 10 on mounting flange 11 and the outer diameter of the assembly relative to the inner diameter of the pipe, are such that the flow-tube assembly is coaxially disposed within the pipe 13, thereby admitting fluid into the annular passage between the exterior of the flow-tube assembly and the inner surface of the pipe.

Thus, the flow tube has fluid pressure both on its inside and outside, and it need not withstand high differential pressures, but only those which will be encountered across the flow device. Since it need not contain the static pressure of the system, it can be of lightweight and inexpensive construction. Thus the insert-type flow tube offers great flexibility in installation, for it can be fitted on any existing lines, as long as the flange size of the flow-tube assembly can be matched to the pipe flange size.

Flow-tube assembly 10, as best seen in FIGS. 2, 3 and 4, is constituted by a cylindrical inner tube 17 formed of a non-magnetic material such as reinforced fiber glass or nylon. The end of the inner tube is integral with or cemented on a circular flange section 11A having an extension tab 11Ae. Inner tube 17 is disposed concentrically within an outer tube 23 of larger diameter to define an annular region within which the flowmeter electromagnet and its electrostatic shield are disposed. Outer tube 23 is secured at its end to a flange section 11B having a tab extension 11Be matching flange section 11A and extension 11Ae, respectively.

Installed on inner tube 17 at diametrically-opposed points thereon are a pair of electrodes 18 and 19, only one of which is visible in FIG. 3, the electrodes being connected by leads 21 to a terminal box 22 mounted on tab extension 11Be.

The electromagnet is constituted by a pair of flat spiral-wound coils 24 and 25, which are contoured to conform to the curvature of the inner tube 17. The coils are symmetrically mounted on the upper and lower halves of a thin sleeve 26, formed of asbestos or similar insulating material. The inner surface of sleeve 26 is plated, coated or otherwise provided with a layer 27 of electrically conductive material, such as aluminum or copper. This conductive non-magnetic layer functions to electrostatically shield the fluid passing through the inner tube from the electromagnetic coils.

Surrounding coils 24 and 25 and spaced therefrom, is a magnetic shell 28 made of iron or other ferromagnetic material. This shell provides a controlled return path for the magnetic flux produced by the coils, the shell lying against the inner surface of the outer tube 23.

The leads 21 from the electrodes, the wires from coils 24 and 25 and the ground wire from electrostatic shielding layer 27, are brought from the annular region between the inner and outer tubes of the flowmeter assembly and pass as a bundle between the tab extensions 11Ae and 11Be of the flange sections to the terminals in terminal box 22. After these connections are made, the two flange sections are joined together by a suitable bonding agent to creat the mounting flange 11 shown in FIG. 1. The air space remaining in the annular region between the inner and outer tubes of the assembly is then filled with a suitable potting compound, such as an epoxy resin, to seal in the components and thereby isolate them from the field. Thus while all components of the meter are submerged in the fluid, they are protected therefrom.

In flange 11, the two lower holes 29 and 30 on the tab extension, are designed to receive the flange bolts 16 (FIG. 1), which join the flowmeter flange to the pipe flanges. These holes also serve to properly locate flow-tube assembly 10 within the pipe section. The single upper hole 31 on the tab extension of flange 11 is provided for lifting purposes.

Referring now to FIG. 5, one of the coils, namely coil 24, is separately shown in plan view. It will be seen that the coil is spiral-wound in pancake style in a common plane and has a diamond configuration. Thus the thickness of the coils is no greater than that of the wire to produce a flat or planar form. When the coils are contoured to conform to the curvature of the inner tube, the coils assume a saddle-like configuration. In practice, two layers may be used for the coils, the resultant coil still being quite flat.

The concentric arrangement of the components within the annular region of the flow-tube assembly and the flat or planar coils therein, makes possible a compact assembly of small radial thickness. In practice, this thickness may be in the range of one-half to five-eighths of an inch in a two-or-three foot diameter meter, thereby minimizing the insertion loss of the assembly.

It is also possible, as shown in FIG. 6, to place a flange 11' at a point displaced from the end of the flow-tube assembly 10, such as at the midpoint of the assembly. In this instance, the flow-tube assembly, half of which lies in pipe 12 and the other in pipe 13, is fabricated so that its outer tube is formed by two pieces, each having an integral flange section of one half the thickness of the completed flange. The inner tube in this case, is without any flange.

Alternatively, the insert meter may be made entirely without flanges, in which case the flow-tube assembly 10 is inserted into a pipe section and held therein by grout, cement or the like. For this purpose, the various wires from the components of the assembly are brought out through the pipe section by means of a suitable water-proof cable. In order to maintain a balanced pressure on both the inner and outer wall of the flow-tube assembly, openings are left in the grout at one end of the insert.

The operation of the device is based on Faraday's Law of electromagnetic induction. As shown in FIG. 7, the fluid to be metered passes through the inner tube 17 in the direction of the longitudinal axis X which is mutually perpendicular to the plane of the electrodes 18 and 19, and to the plane Y of the electromagnetic field B established between coils 24 and 25.

We shall consider a section of the metered fluid passing through the inner tube 16 as a conductor, the length of which is equal to the diameter of the inner tube. As the fluid moves transversely at velocity V through magnetic field B, a voltage E is induced across this section in the plane of the electrodes. This voltage is proportional to the rate of fluid flow. Expressed mathematically, $$E = 1/C\ BVD;\ \text{where}$$

$c$ is a constant. Thus the insert meter functions in the same manner as a standard magnetic flowmeter, but is much more compact and more easily installed.

While there have been shown and described preferred embodiments of insert-type electromagnetic flowmeters in accordance with the invention, it will be appreciated that many changes and modifications may be made therein without, however, departing from the essential spirit of the invention.

We claim:

1. An insert-type electromagnetic flowmeter, said flowmeter being provided with a flow-tube assembly of relatively small radial thickness adapted to fit within a line pipe conducting the fluid to be metered, said flowmeter assembly comprising:
    A. concentrically-disposed inner and outer tubes of uniform diameter defining an annular region;
    B. a pair of flat coils symmetrically disposed within said region about said inner tube and contoured to conform to the curvature thereof,
    C. a magnetically-permeable shell surrounding said coils, said shell being adjacent the outer tube,
    D. a potting compound filling the remaining space in said region to seal in the components disposed therein, and
    E. a mounting flange mounted at the end of said assembly, said flange being constituted by two joined sections, one of which is secured to the end of the inner tube and the other to the end of the outer tube, leads from the coils being sandwiched protectively between the joined sections.

2. A flowmeter as set forth in claim 1, wherein said inner and outer tubes are fabricated of fiberglass.

3. A flowmeter as set forth in claim 1, wherein said flat coils are constituted by a spiral-wound layer having a diamond-shaped configuration.

4. A flowmeter as set forth in claim 1, further including a layer of electrically-conductive material interposed between said coils and said inner tube to provide an electrostatic shield.

5. A flowmeter as set forth in claim 4, wherein said layer is formed on the inner surface of an insulating sleeve surrounding said inner tube.

6. A flowmeter as set forth in claim 1, wherein said flange includes an extension tab, a connector box supported thereon, the leads from the coils in said region passing between the sections of the flange to said box.

7. A flowmeter as set forth in claim 1, wherein the radial thickness of said assembly is less than 1 inch.

8. A flowmeter as set forth in claim 1, wherein the outer tube of the flow-tube assembly is spaced from the inner surface of the pipe in which the assembly is inserted, to define an annular passage into which the fluid is admitted.

* * * * *

UNITED STATES PATENT OFFICE
CERTIFICATE OF CORRECTION

Patent No. 3,745,824     Dated July 17, 1973

Inventor(s) Elmer D. Mannherz and John S. Yard

It is certified that error appears in the above-identified patent and that said Letters Patent are hereby corrected as shown below:

Column 2, line 22 "flowm-" should have read -- flow- --
line 23 "eter" should have read -- meter --

Column 4, line 31 "field" should have read -- fluid --

Signed and sealed this 22nd day of January 1974.

(SEAL)
Attest:

EDWARD M. FLETCHER, JR.          RENE D. TEGTMEYER
Attesting Officer                Acting Commissioner of Patents